(12) United States Patent
Ahnert et al.

(10) Patent No.: US 8,789,675 B2
(45) Date of Patent: Jul. 29, 2014

(54) CLUTCH DEVICE

(71) Applicant: Schaeffler Technologies AG & Co. KG, Herzogenaurach (DE)

(72) Inventors: Gerd Ahnert, Sasbach (DE); Christophe Acker, Gambsheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/956,503

(22) Filed: Aug. 1, 2013

(65) Prior Publication Data

US 2013/0313065 A1 Nov. 28, 2013

Related U.S. Application Data

(63) Continuation of application No. PCT/DE2012/000059, filed on Jan. 26, 2012.

(30) Foreign Application Priority Data

Feb. 4, 2011 (DE) .................. 10 2011 010 341

(51) Int. Cl.
*F16D 13/75* (2006.01)
(52) U.S. Cl.
USPC .................. 192/111.2; 192/111.16

(58) Field of Classification Search
USPC ................ 192/111.2, 111.17, 111.18, 111.5, 192/111.3
See application file for complete search history.

(56) References Cited

U.S. PATENT DOCUMENTS

| 6,347,694 | B1 * | 2/2002 | Szadkowski et al. | ...... 192/30 W |
| 6,394,251 | B1 * | 5/2002 | de Briel | ...... 192/70.252 |

FOREIGN PATENT DOCUMENTS

| DE | 102008051100 A1 | 5/2009 |
| DE | 102009055895 A1 | 9/2010 |
| DE | 102010008439 A1 | 9/2010 |
| FR | 2847626 A1 | 5/2004 |
| WO | 2011147393 A1 | 1/2011 |

* cited by examiner

*Primary Examiner* — David D Le
*Assistant Examiner* — Mark Manley
(74) *Attorney, Agent, or Firm* — Simpson & Simpson, PLLC

(57) ABSTRACT

A clutch device having at least one torque transfer device that can be engaged and disengaged in the axial direction and is frictionally engaged in the engaged state, and at least one wear adjustment device, which has at least one rotatable adjusting ring, at least one rotatably supported spindle drive with a drive pinion, which acts on the adjusting ring, and at least one drive assembly which may be made to engage with the drive pinion and which is pre-tensioned in the axial direction, to turn the spindle drive in the case of wear, the pretensioning force of the drive assembly being stepped.

15 Claims, 3 Drawing Sheets

CLUTCH DEVICE

CROSS-REFERENCE TO RELATED APPLICATIONS

This application is filed under 35 U.S.C. §120 and §365(c) as a continuation of International Patent Application PCT/DE2012/000059, filed Jan. 26, 2012, which application claims priority from German Patent Application No. 10 2011 010 341.4, filed Feb. 4, 2011, which application are incorporated herein by reference in their entirety.

FIELD OF THE INVENTION

The present invention relates to a clutch device.

BACKGROUND OF THE INVENTION

A clutch device is known from. DE 10 2009 035 225 A1. The clutch device has a torque transfer device which can be engaged and disengaged in the axial direction and is frictionally engaged in the engaged state, and a wear adjustment device. The wear adjustment device contains a rotatable adjusting ring, and a rotatably supported spindle drive having a drive pinion, which acts on the adjusting ring. Furthermore, the wear adjustment device has a drive assembly which may be made to engage with the drive pinion and which is pre-tensioned in the axial direction, to turn the spindle drive in the case of wear.

For reasons of cost, normally only a single spindle drive is employed in the wear adjustment device, and only a single drive assembly, which can be brought into positive engagement with the drive pinion of the spindle drive. The spindle drive and the drive assembly are positioned eccentrically in relation to a central axis around which the clutch device is rotatably supported. The pre-tensioning of the drive assembly is a pre-tensioning by means of leaf springs by which the torque transfer device is disengaged, that is, by which a pressure plate of the torque transfer device is moved away from an opposing pressure plate of the torque transfer device in order to suspend the frictional engagement with a clutch plate that is mounted in between. Since the opposing pre-tensioning force of the drive assembly, in contrast to the pre-tensioning force of the leaf springs, acts at only one location on the circumference of the clutch device, that is, at an exact point, when disengaging the torque transfer device there is danger of a skewed lift-off of the pressure plate from the opposing pressure plate or from the clutch plate.

BRIEF SUMMARY OF THE INVENTION

The object of the present invention is to specify a clutch device having a wear adjustment device, with which the danger of a skewed lift-off when disengaging the torque transfer device can be reduced.

This object is fulfilled according to the invention by a clutch device having at least one torque transfer device that can be engaged and disengaged in the axial direction and is frictionally engaged in the engaged state, and at least one wear adjustment device, which has at least one rotatable adjusting ring, at least one rotatably supported spindle drive with a drive pinion, which acts on the adjusting ring, and at least one drive assembly which may be made to engage with the drive pinion and which is pre-tensioned in the axial direction, to turn the spindle drive in the case of wear. The pre--tensioning force of the drive assembly is stepped, so that at the beginning of a disengagement process of the torque transfer device, that is, at the moment when frictional partners of the torque transfer device, such as pressure plate/clutch plate or clutch plate/opposing pressure plate are separated, the opposing force acting at one place through the drive assembly is lower.

The torque transfer device preferably has at least one pressure plate, at least one opposing pressure plate and at least one clutch plate situated in the axial direction between the pressure plate and the opposing pressure plate, so that the frictional pairings of pressure plate/clutch plate and clutch plate/opposing pressure plate already mentioned earlier can be formed. The pressure plate is situated in a housing of the clutch device in a rotationally fixed mounting and is limitedly movable in the axial direction with respect to the opposing pressure plate, while the opposing pressure plate is fixed with respect to the housing. When the clutch plate is clamped between the pressure plate and the opposing pressure plate, frictional transmission of the torque takes place from the input side of the clutch device through the pressure plate and the opposing pressure plate to the clutch plate, and from the clutch plate to the output side of the clutch device.

Preferably the clutch device is designed as a normally engaged clutch device; that is, as a clutch in which the force of an engaging lever element in the form of a diaphragm spring that acts on the pressure plate in the non-actuated state outweighs the force of disengaging leaf springs that act on the pressure plate. During actuation, the diaphragm spring is subjected by an actuator to a force by which the clutch is disengaged. On the other hand, however, the clutch device can also be designed as a normally disengaged clutch device; that is, as a clutch in which the force of the disengaging leaf springs that act on the pressure plate in the non-actuated state outweighs the force of a lever element in the form of a lever spring that acts on the pressure plate. During actuation, the lever spring is subjected by an actuator to a force by which the clutch is engaged.

The clutch device may be designed equally as a push clutch device, that is, as a clutch device in which the actuator exerts a pressing force on the diaphragm spring or lever spring, or as a pull clutch device, that is, as a clutch device in which the actuator exerts a pulling force on the diaphragm spring or lever spring. Furthermore, the clutch may be designed on the one hand as a dry clutch and on the other hand as a wet clutch. Furthermore, the clutch device may be a simple clutch or a multiple clutch, in particular a dual clutch.

The wear adjustment device is preferably a distance-based wear adjustment device.

Preferably, the drive assembly has at least one drive pawl, the free end of which can be brought into essentially positive engagement with the drive pinion. "Essentially positive engagement" means that the engagement does not have to be in the nature of an ideal form-locked engagement, but that the drive pawl and the free end of the drive pinion, which engages with the tooth structure, in particular a tooth gullet of the tooth structure of the drive pawl, may also have contours which deviate slightly from each other. Furthermore, the essentially positive engagement may also include a frictional component.

Besides the drive pawl, the drive assembly preferably has at least one bias spring, which is spaced at least partially apart from the drive pawl, at least when the torque transfer device is in the engaged state. Because of this partial spacing, it is possible in an especially simple way to make the pre-stressing force of the entire drive assembly, that is, the opposing force that can be produced by the drive pawl and bias spring, stepped.

In particular, it is advantageous if the inner end (in the radial direction) of the bias spring fits against a spring segment of the drive pawl and its outer end (in the radial direction) is spaced apart from the spring segment of the drive pawl by a stop, at least when the torque transfer device is in the engaged state. The stepped nature of the pre-stressing force of the drive assembly is favored by this as well. Preferably, the bias spring is connected at its inner end (in the radial direction) to a housing component of the clutch device, preferably a housing cover. Furthermore, it is advantageous if the drive pawl is connected at the inner end (in the radial direction) of the spring segment to the aforementioned housing component, in particular the clutch cover. Preferably, the connection of the bias spring and of the spring segment of the drive pawl to the housing component, in particular the housing cover, is made by the same means of connection, for example by a bolt, preferably a stepped bolt, a rivet or a screw.

Preferably, the bias spring is situated on an outer surface of a housing component of the clutch device, preferably a housing cover. Alternatively or additionally, it is advantageous if a spring segment of the drive pawl which extends essentially in the radial direction is situated on an outer surface of a housing component of the clutch device, preferably a housing cover. This makes it possible for the bias spring and/or the spring segment of the drive pawl to be pre-tensioned against the aforementioned housing component, in particular against the housing cover. In this case, the precise setting of the pre-stressing force can be made outside of the housing, that is, also even after installation of the clutch device, in a simple manner.

According to another preferred exemplary embodiment, the stop extends in the axial direction through at least one opening or cutout in the drive pawl, preferably in the spring segment of the drive pawl, and is located on a housing component of the clutch device, preferably the housing cover, at least in contact. The stop can be attached on the radially outer end of the bias spring, that is, it may be designed as a separate component, but it may also be designed as a stop segment in a single piece with the bias spring. If the aforementioned stop is attached or formed on the bias spring side, it can be brought into contact with the housing component, such as the housing cover. However, at "least in contact" also means in this connection that the stop may also be attached on the side of the housing component, in particular the housing cover, or may be formed in a single piece with the housing component, in particular the housing cover. In this case the stop can then be brought into contact with the radially outer end of the bias spring.

Preferably, a spring rate of the bias spring in the axial direction is the same as or greater than a spring rate of the drive pawl. In particular, it is advantageous if a spring rate of the bias spring in the axial direction is the same as or greater than a spring rate of a spring segment of the drive pawl. This makes it possible for the second stage of the pre-stressing force to be greater than the first stage. This has the advantage that the full pre-stressing force of the drive assembly in the axial direction acts at one point on the pressure plate of the torque transfer device only after the frictional engagement between pressure plate and clutch plate or between clutch plate and opposing pressure plate has already been canceled. If an inclination or a tilting of the pressure plate non-rotatably suspended by leaf springs should occur in this situation because of the bias force acting in one place, this inclination at least would no longer have any negative effects on the friction lining of the clutch plate.

Preferably, it is possible to bring a spacer on the drive assembly side into contact with a stop region that is formed on the adjusting ring side or the torque transfer device during a disengagement motion of the torque transfer device. This stop region may be designed in a single piece with the adjusting ring or a component of the torque transfer device, but it may also be designed as a separate component. For example, the stop region may be designed as a radial projection on an outer circumference of the adjusting ring. The spacer on the drive assembly side may be designed in a single piece with the drive pawl, in particular with an engagement region of the drive pawl that extends in the radial direction, but it may also be designed as a separate component that is bent, for example, around a power rim of a lever element that is provided to engage and/or disengage the torque transfer device.

Alternatively, it is possible for a spacer on the drive assembly side to be brought into contact with a power rim of a lever element that is provided for engaging and/or disengaging the torque transfer device during a disengagement motion of the torque transfer device. In this case, it is possible to form the spacer on the drive assembly side and the stop as a single component, thereby reducing the number of components in the clutch device.

Preferably, at least when the torque transfer device is in the engaged state, a distance between the spacer on the drive assembly side and the stop region is smaller than or equal to a maximum distance between the bias spring and the drive pawl. That makes it possible for a relative motion between the drive pawl and the drive pinion of the spindle drive to be canceled before the second stage of the pre-stressing force takes effect.

Preferably it is likewise possible, at least when the torque transfer device is in the engaged state, for a distance between the spacer on the drive assembly side and the power rim of the lever element to be greater than or equal to a maximum distance between the bias spring and the drive pawl. This is advantageous in particular if the spacer on the drive assembly side and the stop are formed as a single component.

Preferably, the stop extends further through an opening in the housing component of the clutch device, preferably in the housing cover, and can be brought into contact with a power rim of the lever element during a disengagement motion of the torque transfer device. To this end, the stop and the spacer on the drive assembly side are preferably formed as a single component. During the actuation of the lever element, the actuation force can be used to raise the bias spring further.

BRIEF DESCRIPTION OF THE DRAWINGS

The present invention will be explained in greater detail below on the basis of preferred exemplary embodiments, in connection with the associated figures. They show the following.

DETAILED DESCRIPTION OF THE INVENTION

Figure 1:
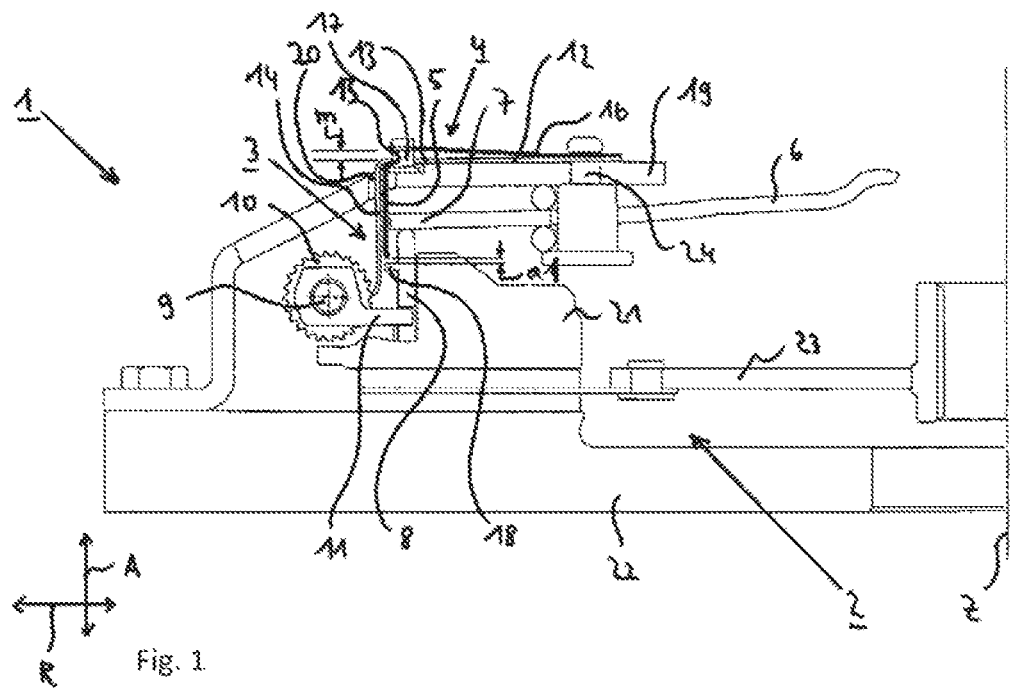
FIG. 1 illustrates a first exemplary embodiment of a clutch device having a torque transfer device and wear adjustment device, in half-sectional view.

FIGS. 1 through 6 relate to a first exemplary embodiment of a clutch device 1. Preferably, the clutch device I is a normally engaged single clutch. However, it can also be a normally disengaged partial clutch of a dual clutch, for example, or a clutch constructed or actuated differently, as already explained in the descriptive introduction.

The clutch device 1 has at least one torque transfer device 2. The torque transfer device 2 has at least one pressure plate 21, at least one opposing pressure plate 22 and at least one clutch plate 23, situated between the pressure plate 21 and the opposing pressure plate 22 in the axial direction A. The clutch device 1 is rotatably supported around a central axis Z, the central axis Z being indicated as a dashed line on the right side of the half-sectional view of the clutch device 1 depicted in FIG. 1.

The opposing pressure plate 22 of the torque transfer device 2 is firmly connected to at least one housing component of the clutch device 1. In particular, the opposing pressure plate 22 is screw-connected to a housing cover 19. The pressure plate 21 is supported in a rotationally fixed mounting in the clutch housing, in particular in the axial direction A between the housing cover 19 and the opposing pressure plate 22, and is limitedly movable in the axial direction A of the clutch device 1. In particular, the pressure plate 21 is attached or suspended non-rotatably in the housing by means of a plurality of leaf springs (not shown), and is pre-tensioned away from the opposing pressure plate 22, that is, in the upward direction in relation to FIG. 1.

In addition, the clutch device 1 has at least one lever element 6, which is designed as a diaphragm spring in the case of a normally engaged clutch device 1 and as a lever spring in the case of a normally disengaged clutch device 1. The lever element 6 is braced on the housing side, in the depicted exemplary embodiment on the side of the housing cover 19, and is actuated by an actuator (not shown) which acts on tips of the lever element 6 which lie on the inside in the radial direction R. The lever element 6 is braced on the housing cover 19 by means of one or more supporting devices, which contain, for example, two wire rings running in the circumferential direction of the clutch device 1, between which the lever element 6 is tiltably supported in the axial direction A. In addition, the bearing device contains, for example, bolts 24, which are designed in particular as stepped bolts, and by which the wire rings are held on the housing cover 19. The lever element 6 acts indirectly on the pressure plate 21 through an adjusting ring 8, which can be assigned to a wear adjustment device 3, preferably a distance-based wear adjustment device, which will be addressed below.

In a normally engaged clutch device 1 the effective force of the lever element 6 in the form of a diaphragm spring outweighs the opposing force of the leaf springs, while in a normally disengaged clutch device 1 the opposing force of the leaf springs outweighs the effective force of the lever element 6 in the form of a lever spring. Accordingly, actuation of the diaphragm spring of a normally engaged clutch device 1 results in disengagement of the clutch device 1, that is, lifting of the pressure plate 21 and removal of the pressure plate 21 from the opposing pressure plate 22, while actuation of the lever spring in a normally disengaged clutch device 1 results in the engaging of the clutch device 1.

With the clutch engaged, torque is transmitted frictionally to the clutch plate 23 from the input side of the clutch device 1, for example from a dual mass flywheel, through the housing and both the opposing pressure plate 22 and the pressure plate 21, both of which are connected to the housing in a rotationally fixed connection. From the clutch plate 23, which is frictionally clamped between the opposing pressure plate 22 and the pressure plate 21, the torque is transmitted to the output side of the clutch device 1, for example to an input shaft of a gear unit.

Since, due to the frictional engagement, both the friction surfaces of the opposing pressure plate 22 and of the pressure plate 21, as well as the friction linings of the clutch plate 23, are subject to wear, over the lifetime of the clutch device 1 the pressure plate 21 must be moved closer and closer to the opposing pressure plate 22 in order to compensate for the loss of thickness of the friction surfaces and of the thickness of the friction linings in axial direction A, or to be able to engage the torque transfer device 2. To this end, in the clutch device 1 the wear adjustment device 3 already mentioned earlier is preferably constructed as a distance-based wear adjustment device.

The wear adjustment device 3 has a drive assembly 4 which includes, among other components, a drive pawl 12 and a bias spring 16 that acts on the drive pawl 12. Preferably the drive assembly 4 is connected to the housing or the housing cover 19, and at least in the axial direction A is elastically pre-tensioned against a drive pinion 10 of a spindle drive 9. A radial segment of the drive assembly 4 extends preferably on an outer surface of the housing or of the housing cover 19, so that the pre-tensioning of the drive assembly 4 preferably also occurs in the axial direction A against the housing or the housing cover 19.

Figure 6:
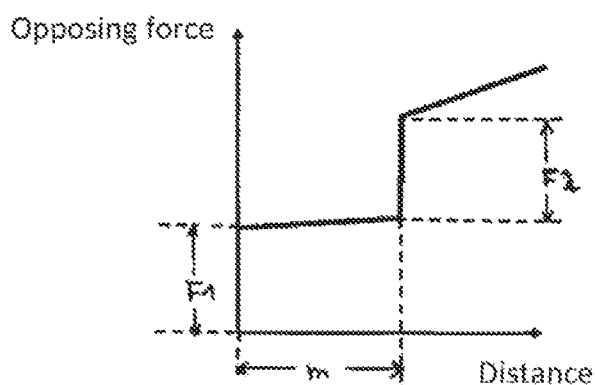
FIG. 6 is a distance/force diagram which shows a stepped force progression of the pre-stressing force of a drive assembly of the wear adjustment device; and, FIG. 7 illustrates a second exemplary embodiment of the clutch device.

The drive assembly 4 can be brought to an essentially positive engagement with the drive pinion 10 of the spindle drive 9, in order to rotate the spindle drive 9 through the drive pinion 10 which is situated non-rotatably on the spindle drive, in the case of wear, The pre-tensioning force of the drive assembly 4 is stepped, as depicted in the distance/force diagram in FIG. 6.

The drive pawl 12 of the drive assembly 4 is preferably designed as a single piece, for example as a sheet metal component. The drive pawl 12 has a spring segment 13, which in the exemplary embodiment depicted in FIG. 1 extends essentially in the radial direction R of the clutch device 1 outside of the housing; in particular of the housing cover 19. Depending on the external contour of the housing cover 19 and/or on the pre-tensioning of the spring segment 13, it is also possible that spring segment 13 is slightly inclined relative to a radial plane. The spring segment 13 transitions to an engaging segment 14 of the drive pawl 12. In the exemplary embodiment depicted in FIG. 1, the engaging segment 14 runs essentially in the axial direction A of the clutch device 1.

Through an opening 20 in the housing cover 19 extends the drive pawl 12, or more precisely the engaging segment 14 of the drive pawl 12, from the outer surface of the clutch housing into the interior of the clutch housing and in the direction of the drive pinion 10.

A free end of the drive pawl 12, in particular of the engaging segment 14, can be brought into essentially positive engagement with the drive pinion 10 of the spindle drive 9. In order to keep the free end of the engaging segment 14 in contact with a circumferential surface of the drive pinion 10 during actuation of the clutch device 1, it is advantageous if the engaging segment 14, in addition to the pre-tensioning in the axial direction A by the spring segment 13, is also pre-tensioned in the radial direction R against the drive pinion 10.

The spindle drive 9, on which the drive pinion 10 is non-rotatably mounted, is rotatably supported by at least one spindle holder 11 on the side of the pressure plate 21, the spindle holder 11 being joined for example to a side of the pressure plate 21 that faces away from the clutch disk 23, in particular by screwing or riveting.

The drive pinion 10 is provided on its circumferential surface with a tooth structure that has a certain pitch. The free end of the engaging segment 14 is designed to be able to mesh essentially positively with the tooth structure. To this end, the free end preferably has, for example, an area that projects in the radial direction R of the clutch device 1 to the drive pinion 10. The engagement can be favored by the pre-tensioning in the radial direction R, mentioned earlier. In order to enable a sensitive wear adjustment device, it is possible for the drive pawl 12 to have a plurality of engaging segments 14 of varying lengths, the length difference falling in a range that is smaller than the pitch of the tooth structure.

The spindle drive 9 is connected to the adjusting ring 8 by means of a spindle nut, while a rotary motion of the spindle drive 9 is converted to a linear motion of the spindle nut, and the linear motion of the spindle nut is converted to a rotary motion of the adjusting ring 8. Preferably, the adjusting ring 8 is designed as a ramp ring. The ramps of the adjusting ring 8 are situated so that they slide on opposing ramps which are formed on the side of the pressure plate 21 facing away from the clutch plate 23, preferably recessed in the pressure plate 21.

An area of the adjusting ring 8 which lies opposite the ramps and opposing ramps in the axial direction A is ideally in contact with a power rim 7 of the lever element 6, both during the engaging and during the disengaging of the torque transfer device 2. This area is referred to below as the contact surface on the lever element side.

If the torque transfer device 2 or the clutch device 1 is being engaged, the pressure plate 21 moves toward the opposing pressure plate 22, that is, downward in reference to FIG. 1. As this occurs, the free end of the drive pawl 12 or of the engaging segment 14 of the drive pawl 12 slides over a tooth flank of the drive pinion 10. If there is sufficient clutch wear, the pressure plate 21 must move further toward the opposing pressure plate 22, so that ultimately the free end of the drive pawl 12 skips over the tooth crest that follows the tooth flank.

During the subsequent disengagement of the clutch device 1, the free end of the drive pawl 12 clicks into the tooth gullet that follows the skipped tooth crest. During the disengagement motion, that is, while the pressure plate 21 is moving upward in reference to FIG. 1, the drive pawl 12 drives the drive pinion 10 in the clockwise direction in reference to FIG. 1. Together with the drive pinion 10, the spindle drive 9 also turns, converting the rotary motion into a linear motion of the spindle nut. The adjusting ring 8 is turned by the linearly moved spindle nut, so that the ramps of the adjusting ring 8 move upward on the opposing ramps recessed in the pressure plate 21. This causes the distance between the contact surface of the adjusting ring 8 on the lever element side and the pressure plate 21 to increase, until the clutch wear has been compensated for in terms of distance, in reference to the power rim 7 of the lever element 6.

In order to limit the relative distance between the drive pinion 10 and the drive pawl 12 while disengaging the torque transfer device 2, the drive assembly 4 preferably has a spacer 5 on the drive assembly side, whose free end comes into contact with a stop region 18 after a certain disengagement travel distance or airway. The stop zone 18 is situated, for example, on an outer circumference of the adjusting ring 8 as a radial projection, and is made in a single piece with the adjusting ring 8. The spacer 5 on the drive assembly side can be made in a single piece with the drive pawl 12, but can also be made as a separate component, as depicted in FIG. 1.

In this exemplary embodiment, the spacer 5 on the drive assembly side is situated essentially parallel to the engagement segment 14 of the drive pawl 12, and connected to said drive pawl in the area of the spring segment 13 of the drive pawl 12. Preferably, the spacer 5 on the drive assembly side is designed as a strip-shaped, separate component, for example as a sheet metal component, and extends in the axial direction A through the opening 20 in the housing cover 19. The stop 17 comes to rest on the outer surface of the housing cover 19 in the vicinity of the opening 20.

A limitation of the relative distance between the drive pinion 10 and the drive pawl 12 by the spacer 5 on the drive assembly side makes particular sense when the danger exists that because of axial vibrations the pressure plate 21 will swing even farther away from the opposing pressure plate 22 when the clutch device 1 is in the disengaged state. In this case, an unwanted wear adjustment, or an unwanted further wear adjustment, is suppressed by the fact that the drive pawl 12 follows the axial vibration of the pressure plate 21 and of the spindle drive 9 rotatably supported on the pressure plate 21. In particular, in the exemplary embodiment depicted in FIG. 1 this results in a raising of the spring segment 13 of the drive pawl 12 from an outer surface of the housing cover 19.

Furthermore, when the pressure plate 21 is raised from the clutch plate 23 and when the pressure plate 21 is removed from the opposing pressure plate 22, the danger already exists that a skewed lift-off will occur, since the axial pre-tensioning of the drive assembly 4 acts as an opposing force eccentrically through the spindle drive 9 and only at a single place oar the pressure plate 21, in particular in the case of wear registered during prior engaging.

It is therefore advantageous if the pre-tensioning force of the drive assembly 4 is stepped, so that at the beginning of the disengagement process a reduced pre-tensioning force is in effect in the axial direction A, and the full pre-tensioning force in the axial direction A does not take effect until during the disengagement motion, in particular not until the friction pairings of pressure plate 21/clutch plate 23 and clutch plate 23/opposing pressure plate 22 are separated in the partially disengaged state of the clutch device 1.

To this end the drive assembly 4 also has the bias spring 16 which was already mentioned, which, like the spring segment 13 of the drive pawl 12, is preferably situated on the outer surface of the housing cover 19. The bias spring 16 is at least partially spaced apart from the drive pawl 12, more precisely from the spring segment 13 of the drive pawl 12, at least when the torque transfer device 2 is in the engaged state. In particular, it is advantageous here if the inner end of the bias spring 16 in the radial direction R is in contact with the spring segment 13 of the drive pawl 12.

In the depicted exemplary embodiment, the radially inner end of the bias spring 16 and the radially inner end of the spring segment 13 of the drive pawl 12 are connected to the housing cover 19 by the bolt 24. This bolt 24, which is preferably designed as a stepped bolt, also serves on the other side of the housing cover 19, that is, in the interior of the clutch housing, to support the lever element 6 by the two wire rings.

With its outer end in the radial direction R, the bias spring 16 is spaced apart from the spring segment 13 of the drive pawl 12 by a stop 17, at least when the torque transfer device 2 is in the engaged state; this spacing when the torque transfer device 2 is in the engaged state is designated below as the maximum distance m.

In the depiction in FIG. 1, when the torque transfer device 2 is in the engaged state, a distance a1 between the spacer 5 on the drive assembly side and the stop region 18 on the adjusting ring side is smaller than the maximum distance m between the bias spring 16 and the drive pawl 12. It is also possible, however, that the distance a1 and the maximum distance in are essentially the same.

In the depicted exemplary embodiment, the stop 17 is attached to the radially outer end of the bias spring 16 and extends in the axial direction A. However, it is also possible for bias spring 16 and stop 17 to be constructed as a single component. Likewise, it is possible for the stop 17 to be connected to the housing cover 19 or constructed in a single piece with it, instead of with the bias spring 16.

In the area of the stop 17, the spring segment 13 of the drive pawl 12 has an opening 15 through which the stop 17 extends in axial direction A, in order to make contact with the housing cover 19 which lies beneath, under pre-tensioning by the bias spring 16. Instead of the opening 15, the drive pawl 12 may also have a recess, for example in the form of an incision, in its outer contour.

Preferably, the spring rate of the bias spring 16 in the axial direction A is the same as or greater than the spring rate of the drive pawl 12 in the axial direction. In particular, it is advantageous if the spring rate of the bias spring 16 in the axial direction A is the same as or greater than the spring rate of the spring segment 13 of the drive pawl 12 in the axial direction A.

The stop region 18, with which the free end of the spacer 5 on the drive assembly side may be brought into contact during the disengagement motion of the torque transfer device 2, may be formed on the one hand on the side of the adjusting ring 8, but on the other hand may also be formed on the side of the torque transfer device 2.

The disengagement process of the clutch device 1 when wear is registered will now be explained, with reference to FIGS. 2 through 5. In the preceding engagement process of the clutch device 1, the free end of the engaging segment 14 of the drive pawl 12 skipped over a tooth crest of the drive pinion 10 and clicked into the gullet that followed the tooth crest.

Figure 2:
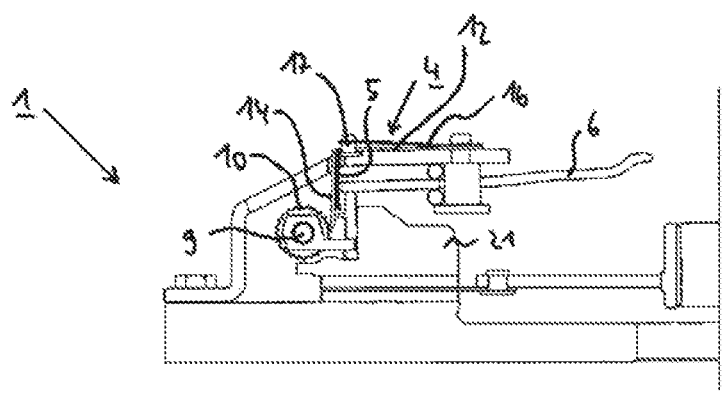
FIG. 2 illustrates the clutch device from FIG. 1 in the engaged state, where the wear adjustment device has registered wear.

This starting situation at the operating point of the clutch device 1 is depicted in FIG. 2. In this situation, with reference to FIG. 6, the first stage of the pre-tensioning force of the drive assembly 4 is in effect. The opposing force, which corresponds to the pre-tensioning force F1 of the drive pawl 12 against the housing cover 19, must be applied in addition by the disengaging leaf springs, so that the pre-tensioning force F1 measures as small as possible.

Figure 3:
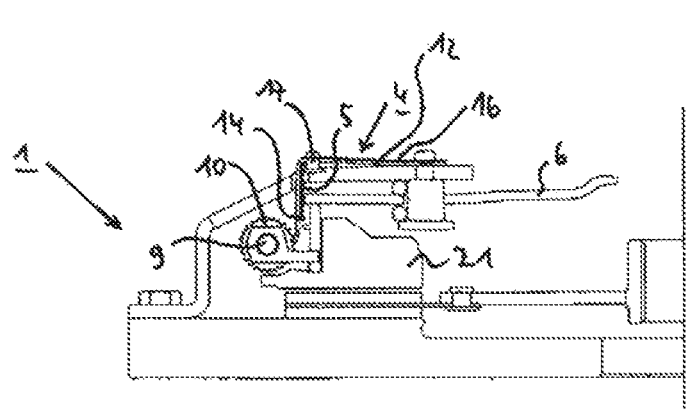
FIG. 3 illustrates the clutch device from FIG. 2 in a partially disengaged state.

By actuating the lever element 6, which is designed as a diaphragm spring in the depicted exemplary embodiment, the clutch device 1 is brought to a partially disengaged state, which is depicted in FIG. 3. As this occurs, inside points of the diaphragm spring are pressed downward with reference to FIG. 3, so that while bracing on the wire rings of the bearing device, the power rim of the diaphragm spring is moved upward with reference to FIG. 3, and the pressure plate 21 is moved upward by the pre-tensioned leaf springs, together with the adjusting ring 8 and the spindle drive 9. With reference to FIG. 6, this means that the radially outer end of the spring segment 13 of the drive pawl 12 is moved away from the outer surface of the housing cover 19 by a distance corresponding to the maximum distance m, since the free end of the engaging segment 14 of the drive pawl 12 is clicked into the tooth gullet by the registration of wear.

In this state, the second stage of the pre-tensioning force of the drive assembly 4 then takes effect, that is, the pre-tensioning force F2, with which the bias spring 16 is pre-tensioned against the housing cover 19. With reference to FIG. 6, this means that after the distance m in FIG. 3 has been traversed by the leaf springs, the opposing force to the full pre-tensioning force F1+F2 must now be applied.

This is not critical, since the frictional pairings of pressure plate 21/clutch plate 23 and clutch plate 23/opposing pressure plate 22 are already separated in the partially disengaged state, that is, the lift-off has already occurred. Furthermore, in this situation the clamping force of the lever element 6 on the adjusting ring 8 has already been reduced, so that the adjusting ring 8 can be rotated immediately by the spindle drive 9, which is turning under the effect of the drive assembly 5.

For the sake of completeness, let it be mentioned that in the event that no wear has been registered during the previous engagement of the clutch device 1, the free end of the engaging segment 14 of the drive pawl 12 in the partially disengaged state corresponding to FIG. 3 would slide over the tooth flank of the drive pinion 10, and the radially outer end of the spring segment 13 of the drive pawl 12 would not be lifted from the outer surface of the housing cover 19. Only the pre-tensioning force F1, that is, the first stage of the pre-tensioning force of the drive assembly 4, would be in effect. In the partially disengaged state, the stop region 18 on the adjusting ring side would already come into contact with the free end of the spacer 5 on the drive assembly side, in order to avoid unwanted rotation due to relative movements.

Figure 4:
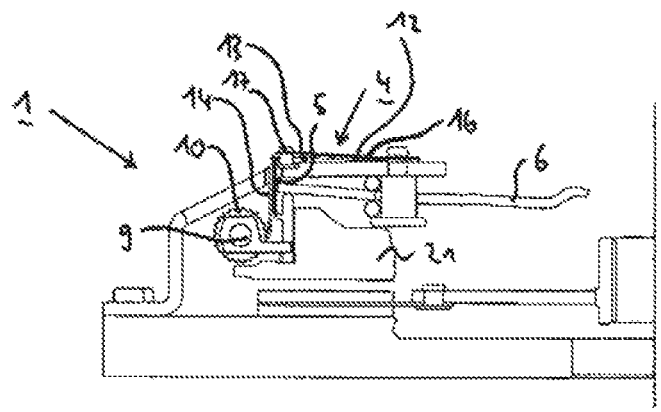
FIG. 4 illustrates the clutch device from FIG. 3 in a completely disengaged state.

In FIG. 4, the fully disengaged state of the torque transfer device 2 is reached. In this state, the stop region 18 on the adjusting ring side also comes into contact with the free end of the spacer 5 on the drive assembly side, in order to avoid unwanted additional rotation.

Figure 5:
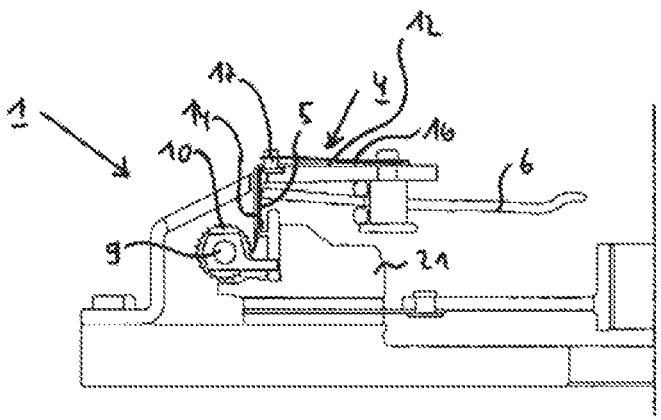
FIG. 5 illustrates the clutch device from FIG. 4 in a completely disengaged state, where a pressure plate of the torque transfer device is oscillating in the axial direction.

In FIG. 5, the pressure plate 21 undergoes axial vibration, and oscillates together with the adjusting ring 8 and the spindle drive 9 in the direction of the clutch plate 23 or opposing pressure plate 22, while the diaphragm spring remains in its activated state. Thus the contact surface of the adjusting ring 8 on the diaphragm spring side lifts off from the power rim of the diaphragm spring. In this situation there is no unwanted registration of wear, since the spring segment 13 of the drive pawl 12 pre.-tensioned with the pre-tensioning force F1 moves toward the housing cover 19, so that the free end of the engaging segment 14 under the pre-tensioning force F1 can follow the drive pinion 10, and when the spring segment 13 rests on the housing cover 19 can possibly slide along on the tooth flank, without skipping the following tooth crest.

Figure 7:
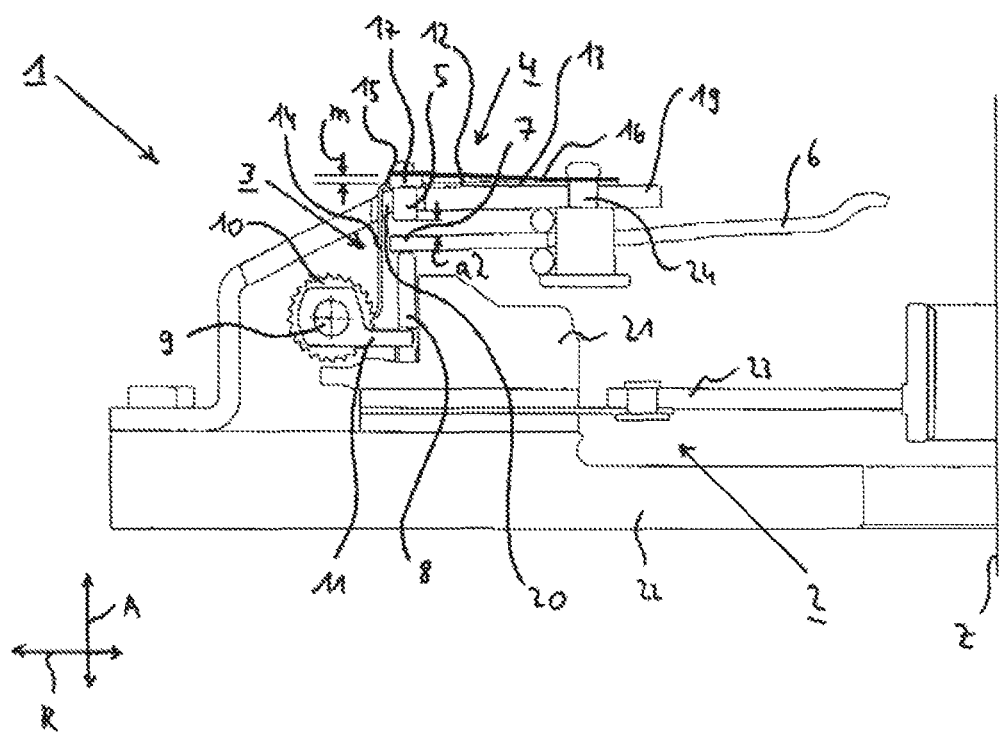

FIG. 7 depicts a second exemplary embodiment of the clutch device 1. To avoid repetitions, the following section only examines the differences from the first exemplary embodiment, using the same reference labels to identify the same features.

In contrast to the first exemplary embodiment, the opening 20 that is provided in the housing cover 19 is larger, since not only the engagement segment 14 of the drive pawl 12 running in the axial direction A reaches through it, but also the bolt-shaped spacer 5 on the drive assembly side. The free end of the spacer 5 on the drive assembly side can be brought into contact with the side of the power rim 7 of the lever element 6 facing away from the clutch plate 23, so that when the torque transfer device 2 is in the disengaged state, the power rim 7 of the lever element 6 may be clamped between the contact surface of the adjusting ring 8 on the lever element side and the spacer 5 on the drive assembly side. In this way, the stop region 18 can be brought into contact with the power rim 7 of the lever element 6 to engage and/or disengage the torque transfer device 2. It is thus possible to dispense with a radial projection on the outer circumference of the adjusting ring 8, as depicted with reference to the first exemplary embodiment in FIG. 1.

Preferably, the stop 17 and the spacer 5 on the drive assembly side are designed as one component, the stop 17 having, for example, a projection or a larger diameter than the spacer 5 on the drive assembly side, in order to come into contact with an outer surface of the housing cover 19. The single-piece design makes it possible to dispense with a separate spacer 5 on the drive assembly side, as depicted with reference to the first exemplary embodiment in FIG. 1.

Preferably, at least when the torque transfer device 2 is in the engaged state, a distance a2 between the spacer 5 on the drive assembly side and the power rim 7 of the lever element 6 is larger than the maximum distance m between the bias spring 16 and the drive pawl 12. It is also possible, however, that the distance a2 and the maximum distance m are essentially equal.

The actuation, as well as the wear registration and adjustment of the clutch device 1 of the second exemplary embodiment, occurs in accordance with the clutch device 1 of the first exemplary embodiment.

The preceding exemplary embodiments relate to a clutch device 1 having at least one torque transfer device 2 that can be engaged and disengaged in the axial direction A and is frictionally engaged in the engaged state, and at least one wear adjustment device 3 which has at least one rotatable adjusting ring 8, at least one rotatably supported spindle drive 9 with a drive pinion 10, which acts on the adjusting ring 8, and at least one drive assembly 4 which may be made to engage with the drive pinion 10 and which is pre-tensioned in the axial direction A, to turn the spindle drive 9 in the case of wear, the pre-tensioning force of the drive assembly 4 being stepped. Although the preceding exemplary embodiments relate to only a two-stage version of the pre-tensioning force of the drive assembly 4, it is also possible to design the pre-tensioning force of the drive assembly with multiple stages; that is, having more than two stages,

REFERENCE VARIABLES 1 clutch device
2 torque transfer device
3 wear adjustment device
4 drive assembly
5 spacer on the drive assembly side
6 lever element
7 power rim
8 adjusting ring
9 spindle drive
10 drive pinion
11 spindle holder
12 drive pawl
13 spring segment
14 engaging segment
15 opening on the spring segment side
16 bias spring
17 stop
18 stop region
19 housing cover
20 opening on the housing cover side
21 pressure plate
22 opposing pressure plate
23 clutch plate
24 bolt
A axial direction
R radial direction
Z central axis
m maximum distance
a1 distance
a2 distance
F1 pre-tensioning force of the drive pawl against the housing cover
F2 pre-tensioning force of the bias spring against the housing cover

What is claimed is:

1. A clutch device comprising:
at least one torque transfer device that can be engaged and disengaged in an axial direction and is frictionally engaged in the engaged state; and,
at least one wear adjustment device comprising:
at least one rotatable adjusting ring;
at least one rotatably supported spindle drive with a drive pinion, which acts on the adjusting ring; and
at least one drive assembly wherein when the torque transfer device is in the engaged state, the at least one drive assembly includes:
at least one drive pawl, the free end of which may be made to engage with the drive pinion in an essentially positive engagement; and
at least one bias spring:
which is spaced at least partially at a distance from the drive pawl;
which may be made to engage with the drive pinion; and
which is pre-tensioned in the axial direction, to turn the spindle drive in the case of wear, wherein the pre-tensioning force of the drive assembly is stepped, and, the at least one bias spring includes:
an inner end in the radial direction that fits against a spring segment of the drive pawl; and,
an outer end in the radial direction spaced apart from the spring segment of the drive pawl by a stop.

2. The clutch device recited in claim 1, wherein the bias spring or a spring segment of the drive pawl is situated on an outer surface of a housing component of the clutch device.

3. The clutch device recited in claim 1, wherein the stop extends in the axial direction through at least one opening or cut-out in the drive pawl and is at least in contact with a housing component of the clutch device.

4. The clutch device recited in claim 1, wherein a spring rate of the bias spring in the axial direction is equal to or greater than a spring rate of the drive pawl.

5. The clutch device recited in claim 1, wherein a spacer on the drive assembly side may be made to engage, during a disengaging motion of the torque transfer device, with a stop region that is formed on the side of the adjusting ring or of the torque transfer device, or with a power rim of a lever element, to engage or disengage the torque transfer device.

6. The clutch device recited in claim 5, wherein the space on the drive assembly side extends in the axial direction through an opening in the housing component of the clutch device.

7. The clutch device recited in claim 5, wherein, at least when the torque transfer device is in the engaged state, a distance between the spacer on the drive assembly side and the stop region is smaller than or equal to a maximum distance between the bias spring and the drive pawl.

8. The clutch device recited in claim 5, wherein, at least when the torque transfer device is in the engaged state, a distance between the spacer on the drive assembly side and the power rim of the lever element is greater than or equal to a maximum distance between the bias spring and the drive pawl.

9. The clutch device recited in claim 1, wherein the bias spring or a spring segment of the drive pawl is situated on an outer surface of a housing cover of the clutch device.

10. The clutch device recited in claim 1, wherein the bias spring and a spring segment of the drive pawl is situated on an outer surface of a housing component of the clutch device.

11. The clutch device recited in claim 1, wherein the bias spring and a spring segment of the drive pawl is situated on an outer surface of a housing cover of the clutch device.

12. The clutch device recited in claim 1, wherein the stop extends in the axial direction through at least one opening or cut-out in the drive pawl and is at least in contact with a housing cover of the clutch device.

13. The clutch device recited in claim 1, wherein the stop extends in the axial direction through at least one opening or cut-out in the spring segment of the drive pawl and is at least in contact with a housing component of the clutch device.

14. The clutch device recited in claim 1, wherein a spring rate of the bias spring in the axial direction is equal to or greater than a spring rate of the drive pawl, and said spring rate is of a spring segment of the drive pawl, in the axial direction.

15. The clutch device recited in claim 5, wherein the space on the drive assembly side extends in the axial direction through an opening in the housing cover of the clutch device.

* * * * *